Patented Nov. 25, 1952 2,619,414

UNITED STATES PATENT OFFICE 2,619,414

SURFACE TREATMENT OF GERMANIUM CIRCUIT ELEMENTS

Robert D. Heidenreich, Madison, N. J., assignor to Bell Telephone Laboratories, Incorporated, New York, N. Y., a corporation of New York No Drawing. Application May 25, 1950, Serial No. 164,303

7 Claims. (Cl. 41—42)

This invention relates to surface treatments for semi conductors and more particularly to a chemical etchant and the method of its application to semiconductor surfaces to improve their electrical characteristics.

In preparing semiconductive bodies for use in circuit elements such as rectifiers, amplifiers, and photosensitive devices, it has been found that the condition of the surface and particularly its smoothness are important in determining the electrical characteristics of the final device.

One object of this invention is to improve the electrical characteristics of semiconductive circuit elements. More particular objects of the invention are to increase the reverse resistance of rectifying junctions to germanium and silicon surfaces, to improve the reproducibility of electrical characteristics of semiconductive circuit elements, to improve the photosensitivity of germanium surfaces, and to reduce the rate of recombination of current carriers in germanium at its surface.

One feature of this invention involves applying to a semiconductive surface of a material such as silicon or germanium an etchant reagent which imparts a high degree of polish or smoothness without introducing damage or fragmentation of the surface layers such as are generally produced by mechanical polishing methods. This reagent includes a combination of acetic acid, hydrofluoric acid, concentrated nitric acid and liquid bromine. A wide range of polishing rates are obtainable with combinations of the above materials by varying the ratios of the constituents.

It has been found that mechanically prepared germanium surfaces alone do not provide an entirely adequate rectifying barrier and that some form of chemical attack on the surface seems to be required. Indications are that such chemical treatments clean off loose debris from the surface, remove lattice distortion and provide an integral lattice structure of germanium or silicon with which to make contact. Chemically etched semiconductive surfaces have highly ordered lattice structures. Grinding of the surfaces leads to the formation of surface cracks and local distortion which must be removed if good rectification properties are to be achieved. In addition to the improvement of the physical condition of the surface by chemical etching, it appears that the chemical treatments alter the surface impurity concentration under certain circumstances.

A brief consideration of the characteristics of germanium may be helpful to an understanding of the disclosure of this invention which follows:

Germanium is known to exhibit two types of semiconduction, intrinsic and extrinsic. In the material employed in the present invention, extrinsic semiconduction is of principal import although it may also exhibit intrinsic semiconduction.

According to present theory, conduction occurs in semi-conductors by two processes, one known as conduction by electrons or the excess process of conduction and the other known as conduction by holes or the defect process of conduction.

One suggested theory of conduction in germanium which also incidentally indicates the importance of the physical condition of the surface is as follows: Germanium is made up of a diamond cubic lattice and when it exists in perfect form at low temperatures all current carriers are bound to the lattice structure. However, slight defects in the lattice such as might be caused by the presence of certain impurities, present to the extent of a few parts in ten million, may provide mobile charge carriers, for example electrons, which are not bound to the lattice structure. Such a situation accounts for the excess process of conduction and material having such impurities is termed n-type, current flowing most readily across a rectifying junction between the body and electrode when the body is biased negative relative to the electrode. Conversely, when an impurity enters the lattice structure and fails to supply enough electrons to complete the lattice, a hole results and the defect process of conduction obtains in which the hole may be considered as a carrier of positive electric charge.

The impurities which alter the lattice or otherwise affect the electrical characteristics of the material, such as its resistivity, photosensitivity, rectification and the like, as distinguished from other impurities which have no effect on these characteristics are termed "significant impurities." These impurities include intentionally added constituents as well as any which are found in the basic material available.

Small amounts of impurities such as phosphorous in silicon and antimony or arsenic in germanium are termed donor impurities because they contribute to the conductivity of the basic material by donating electrons to an unfilled conduction energy band in the basic material. Other impurities, for example, boron in silicon or aluminum in germanium are termed acceptor impurities because they contribute to the conductivity by accepting electrons from the atoms of the basic material in the filled band. Such an acceptance leaves a gap or hole in the filled band, by interchange of the remaining electrons in the filled band those positive holes effectively move about and constitute the carriers of current, and the material and its conductivity are said to be p-type.

Methods of preparing silicon of either conductivity type or a body of silicon including both conductivity types are known. Such methods are disclosed in the application of J. H. Scaff-H. C. Theuerer filed December 24, 1947, Serial No. 793,744 and United States Patents 2,402,661 and 2,402,662 to R. S. Ohl. Germanium material may also be made in either conductivity type or in bodies containing both types and it may be so treated as to enable it to withstand high voltages in the reverse direction from the rectification viewpoint. This material may be prepared in accordance with the process disclosed in the application of J. H. Scaff and H. C. Theuerer filed December 29, 1945, Serial No. 638,351. The method and chemical etchant according to this invention are applicable to the above type materials in improving their electrical characteristics.

In preparing germanium for use in circuit devices the following procedure is employed. First, slabs are cut from the ingot prepared in accordance with the disclosures of the above-identified patents and applications and are ground on both sides using 600-mesh aluminum oxide in water.

Other mechanical polishing methods such as a sandblasting technique may be used to provide a clean surface on which a good contact can be made. The surface which is to be subjected to the etching treatment is improved by the abrading step in that a rapid and even attack by the chemical reagent is insured. The surface to which the back contact is to be applied is copper plated thus enabling a solder connection to be made to a conductive backing member of some material such as brass.

The abraded surface is then subjected to the etching operation. The ingredients of the etch or chemical polishing reagent are glacial acetic acid, hydrofluoric acid (48 per cent), concentrated nitric acid (specific gravity 1.42), and liquid bromine. The acetic acid serves as a diluent to aid in the control of the speed of the etching operation, the hydrofluoric acid serves as a solvent for germanium and silicon, and the bromine and nitric acid are oxidizing agents. The rate of polishing is determined by the concentration of nitric and hydrofluoric acids relevant to the acetic acid with the mixture always saturated with bromine (at room temperature).

A wide range of polishing rates are attainable through varying the ratios of the concentration of the constituents of this etchant or polishing reagent. The following are typical mixtures, all proportions being indicated by volume: A slow rate of polish is attained by employing a mixture comprising 20 parts of glacial acetic acid, 10 parts of concentrated nitric acid, 10 parts of hydrofluoric acid, and 1 part of bromine, while a faster rate is provided by a mixture of 20 parts of glacial acetic acid, 25 parts of concentrated nitric acid, 10 parts of hydrofluoric and 1 part of bromine and a still faster etch results from employing the combination of 15 parts of glacial acetic acid, 25 parts of concentrated nitric acid, 15 parts of hydrofluoric acid and 1 part of bromine. It has been found that very rapid etches such as that provided by a mixture of 10 parts of glacial acetic acid, 25 parts of concentrated nitric acid, 20 parts of hydrofluoric acid and 1 part of bromine result in such a rapid etching process as to be very difficult to control, and, therefore, the third etchant mentioned, namely that employing 15 parts of glacial acetic acid, 25 parts of concentrated nitric acid, 15 parts of hydrofluoric acid and 1 part of bromine, is considered particularly suitable for practical application in the preparation of semi-conductor circuit elements.

It is to be noted that care must be exercised in protecting the supports for holders for the semiconductor wafers from the effects of the polish solution. This may be done by either immersing only the surface to be treated in the chemical polish reagent for one to one and one-half minutes or by coating the supporting members with some protective substance such as wax during the polishing operation. The length of the etch is such that the damaged surface layers of the semiconductor body are completely removed and a smooth surface obtained.

Next the chemical polish or etchant should be removed by a rinse with some fluid which is free from significant impurities which might otherwise uncontrollably contaminate the polished surface. This has been done advantageously by rinsing in methyl alcohol or in high purity, double distilled, water. The surface can then be dried in an air blast or by other noncontaminating means.

The wafer now is in condition to be employed in semiconductive devices or to be sliced or cut into smaller bodies, removed from the backing member and remounted on suitable members for use in circuit devices.

The surface treatment employing the above etchants or polishes results in a surface which is physically smoother than any heretofore attainable. Further in view of the high degree of reproducibility of such surfaces, as to electrical characteristics, it is believed that surface contamination by significant impurities is kept at an extremely low level by the polishing and rinsing techniques described above. In this regard, it is to be noted that all materials employed should be of chemical purity and particularly that ordinary tap water is to be avoided as a rinse since it may deposit a harmful hydrous oxide layer on the polished surface. As a general guide as to the purity of water to be employed in a rinse, it may be said that any water at a pH of about seven or above which contains traces of copper, zinc, iron, arsenic or antimony or any other donor type atoms is to be avoided for best results.

While this process is applicable to the treatment of semiconductor bodies of silicon or germanium to be employed in any of the known types of circuit devices utilizing such bodies, because of the high degree of reproducibility of the characteristics of surfaces thus treated, the treatment has been found particularly advantageous for use in rectifiers, photo devices, and some semiconductor amplifiers. As evidence of the high reverse resistance of n-type germanium diodes having tungsten points on 5-mil tungsten wire as the rectifying contact, reverse currents at one volt for such devices were found to occur in a range of from 0.5 to 2 microamperes after pulsing the sample with an alternating-current pulse of 30 volts with a 50-ohm series resistance for 8/10 of a second and the rectification ratio of both pulsed and unpulsed units was found to lie in a range of from 5,000 to 20,000. At 50 volts the reverse current of a unit after pulsing was found to be only 0.02 to 0.10 milliampere Diode rectifiers having point contacts on germanium surfaces treated in accordance with this invention are found to have a minimum reverse current with no further treatment after the contact is set down on the surface. The usual practice heretofore in the construction of point contact rectifiers has been to place the point on the semiconductive surface and tap or otherwise mechanically jar the unit, apparently to effect a slight movement of the point over the surface, observing the reverse current during the process to ascertain when the point has found an area on the surface with which it has a minimum reverse current. The present treatment in eliminating the necessity of using a tapping technique appears to produce a surface which is uniform and has the optimum characteristics for minimum reverse current over its entirety.

Wafers which have been treated by the acetic acid, nitric acid, hydrofluoric acid, bromine reagent and are then arranged for use in photoelectric devices have been found to exhibit high photosensitivity. Typical characteristics for germanium diodes using a tungsten point contact as the front electrode when exposed to a 100-watt bulb at a distance of one foot are as follows:

| Reverse Bias between front and back electrode | Reverse Current | |
|---|---|---|
| | Dark | Light |
| | μ amps. | μ amps. |
| 1 volt | 3 | 7.5 |
| 5 volts | 40 | 50 |
| 10 volts | 100 | 130 |
| 20 volts | 350 | 460 |

A further advantageous result of the chemical polish set forth above is the reduction of the rate of recombination of current carriers at the surface of the semiconductive body. The significance of this will be more fully appreciated in the light of the disclosure of application Serial No. 50,894, filed September 14, 1948, to J. R. Haynes and W. Shockley to the devices of which the treatment is particularly applicable. Other devices showing improved characteristics attributable to a reduction of the rate of current carrier recombination at the surface are represented by the disclosures in the applications Serial No. 33,466, filed June 17, 1948, of J. Bardeen and W. H. Brattain, Serial No. 35,423, filed June 26, 1948, of W. Shockley, and Serial No. 50,897, filed September 24, 1948, of G. L. Pearson and W. Shockley.

Circuit elements of the type disclosed in the above-identified applications comprise in general a body of semiconductive material, a pair of connections to spaced regions of the body and a third connection to another region of the body. An input circuit is connected between one of the pairs of connections, designated the emitter, and the third connection, designated the base; and an output circuit is connected between the other of the pair of connections, designated the collector, and the base. In one embodiment wherein the body is of n-type material the emitter may be biased positive relative to the base and the collector may be biased negative to the base. As disclosed in the applications noted, such elements are suitable for a variety of uses, e. g. as amplifiers, modulators and oscillators.

In such devices as disclosed in the applications above identified, modulation of the collector current may be effected by modifying the properties of the body of the semiconductive material in the vicinity of a rectifying contact or connection to the body. Specifically, this is accomplished by injecting carriers of electric charges of the sign or polarity not normally present in the semiconductive body through the rectifying contact or connection. The latter may be obtained in several ways, for example, by the use of a limited area metal contact engaging the body, by employing a member or body of semiconductive material of conductivity type opposite that of the first body, in engagement therewith, or by treating portions of the main semiconductive body to produce contiguous areas or regions of opposite conductivity type. In the last two cases mentioned, a rectifying junction or barrier is produced between the bodies or portions of opposite conductivity type.

If the main body is of n-type material, holes are injected into the body by current flowing in the forward or easy flow direction at the emitter. These holes migrate due to diffusion and the fields produced by the emitter and collector currents. As a result a substantial fraction of the holes flow to the region of the collector thereby to aid the emission of electrons at the collector, whereby current multiplications are produced and current gains are realized.

The amplification obtainable from devices of this nature is limited, at least partially, by the number of current carriers injected into the body by the emitter which reach the region of the collector and operate upon this region to modify the properties of the body or collector connection and thus the current flowing to the collector. In addition to the loss of effective carriers from the emitter to the collector region due to diffusion it has also been found that these carriers can be made ineffective by recombining when they approach or reach the surface of the semiconductor. This recombination, in the case of an n-type body into which the emitter injects holes and in which conduction normally occurs by electrons, is the combination of an electron with each hole removing it as a carrier. In the case of the p-type body having injected electrons, recombination occurs by an electron combining with a hole carrier normally present in the body.

Since this process occurs to a large extent at or near the surface it follows that a reduction of the amount of surface between the emitter and collector will reduce the recombination. This reduction may be achieved by close spacing of the contacts, emitter and collector, or by a reduction of the surface area by the production of a smoother surface between the contacts, thus, reducing the total surface area present in the expanse between the contacts.

The theory of operation suggested above as an explanation of the increase in hole and electron lifetimes in semiconductors based on a modification of the physical condition of the surface is not intended to be limiting in any sense. It is offered as the most plausible explanation of the observed process, presently available, it being known that the application of films of certain chemical compounds to semiconductive surfaces as disclosed in the application of J. R. Haynes and R. D. Heidenreich filed July 24, 1950, Serial No. 175,648 will also reduce the rate of recombination of carriers at the semiconductive surface, and, therefore, a chemical layer may result from the use of the present treatment to effect this desirable result.

What is claimed is:

1. The method of altering the electrical characteristics of a semiconductive surface which comprises treating the surface with a fluid mixture including acetic acid, nitric acid, hydrofluoric acid, and bromine, and then washing said fluid mixture from said surface.

2. The method of altering the electrical characteristics of a semiconductive surface which comprises abrading the surface, treating the surface with a fluid mixture including acetic acid, nitric acid, hydrofluoric acid, and bromine, and washing said surface with methyl alcohol.

3. The method of altering the electrical characteristics of a semiconductive surface which comprises treating the surface in a mixture comprising between about 10 and 20 parts by volume of glacial acetic acid, about 10 to 25 parts by volume of concentrated nitric acid, 10 to 20 parts by volume of 48 per cent hydrofluoric acid, and 1 part of bromine, and then washing the fluid mixture from the surface.

4. The method of altering the electrical characteristics of a germanium surface which comprises abrading said surface, etching said surface in a mixture comprising 10 to 20 parts of glacial acetic acid, 10 to 25 parts of concentrated nitric acid, 10 to 25 parts of 48 per cent hydrofluoric acid, and 1 part of bromine, and then washing the etchant from the surface with a methyl alcohol rinse.

5. The method of altering the electrical characteristics of a germanium surface which comprises abrading said surface, etching the surface in a mixture including about 15 parts of glacial acetic acid, about 25 parts of concentrated nitric acid, having a specific gravity of 1.42, about 15 parts of 48 per cent hydrofluoric acid, and about 1 part of bromine at room temperature for a period of about a minute, and then washing said etchant from said surface.

6. A solution for etching the surface of germanium bodies for use in semiconductor translators comprising 15 parts by volume of glacial acetic acid, 25 parts by volume of concentrated nitric acid having a specific gravity of 1.42, 15 parts by volume of aqueous hydrofluoric acid containing 48 per cent by weight of hydrogen fluoride, and 1 volume of liquid bromine.

7. An etchant for germanium surfaces comprising 10 to 20 parts by volume of glacial acetic acid, 10 to 25 parts by volume of concentrated nitric acid, 10 to 20 parts by volume of 48 per cent hydrofluoric acid, and 1 part by volume of bromine.

ROBERT D. HEIDENREICH.

REFERENCES CITED

The following references are of record in the file of this patent:

UNITED STATES PATENTS

| Number | Name | Date |
|---|---|---|
| 2,402,661 | Ohl | June 25, 1946 |
| 2,438,944 | Ransley | Apr. 6, 1948 |
| 2,469,569 | Ohl | May 10, 1949 |